United States Patent [19]

Holt et al.

[11] Patent Number: 4,988,645

[45] Date of Patent: * Jan. 29, 1991

[54] CERMET MATERIALS PREPARED BY COMBUSTION SYNTHESIS AND METAL INFILTRATION

[75] Inventors: Joseph B. Holt, San Jose; Stephen D. Dunmead, Davis; Danny C. Halverson, Modesto; Richard L. Landingham, Livermore, all of Calif.

[73] Assignee: The United States of America as represented by the United States Department of Energy, Washington, D.C.

[*] Notice: The portion of the term of this patent subsequent to Oct. 31, 2006 has been disclaimed.

[21] Appl. No.: 283,440

[22] Filed: Dec. 12, 1988

[51] Int. Cl.⁵ .............................................. C04B 35/52
[52] U.S. Cl. ...................................... 501/91; 501/88; 501/92; 501/96; 501/97; 501/98
[58] Field of Search .............. 419/45; 75/244; 501/88, 501/92, 96, 97, 98

[56] References Cited

U.S. PATENT DOCUMENTS

| | | | |
|---|---|---|---|
| 4,446,242 | 5/1984 | Holt | 501/96 |
| 4,585,618 | 4/1986 | Fresnel et al. | 419/12 |
| 4,610,726 | 9/1986 | King | 75/233 |
| 4,627,815 | 12/1986 | Aldinger et al. | 432/24 |
| 4,726,842 | 2/1988 | Reeve et al. | 75/244 |
| 4,746,363 | 5/1988 | De Angelis | 75/244 |
| 4,770,701 | 9/1988 | Henderson et al. | 75/232 |
| 4,877,759 | 10/1989 | Holt et al. | 501/96 |

OTHER PUBLICATIONS

Holt, "The Use of Exothermic Reactions in the Synthesis and Densification of Ceramic Materials," MRS Bull., 60–64 (10/1/87, 11/15/87).

Holt, "Combustion Synthesis: A New Area of Research in Mat'ls Science," LLNL Brochure (LLL-TB-84, May 1986).

Munir, "Synthesis of High Temperature Mat'ls by Self-Propagating Combustion Methods," Am. Cer. Bull., 67(2):342–349 (Feb. 1988).

Primary Examiner—Stephen J. Lechert, Jr.
Assistant Examiner—Leon Nigohosian, Jr.
Attorney, Agent, or Firm—Henry P. Sartorio; L. E. Carnahan; William R. Moser

[57] ABSTRACT

Ceramic-metal composites (cermets) are made by a combination of self-propagating high temperature combustion synthesis and molten metal infiltration. Solid-gas, solid-solid and solid-liquid reactions of a powder compact produce a porous ceramic body which is infiltrated by molten metal to produce a composite body of higher density. AlN-Al and many other materials can be produced.

18 Claims, 5 Drawing Sheets

CERMET MATERIALS PREPARED BY COMBUSTION SYNTHESIS AND METAL INFILTRATION

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

The invention relates generally to metal-ceramic composite material (cermets), combustion synthesis, and infiltration, and more particularly to certain metal-ceramic composites including AlN-Al and methods for making same.

A variety of refractory ceramic materials including nitrides, nitride-oxide and carbide-oxide composites have been produced by combustion synthesis of powder compacts. The process uses heat evolved during spontaneous chemical reactions between mixtures of solids, solids and liquids or solids and gases produced as a combustion wave initiated by an ignition source rapidly propagates through the compact. The key to self-propagating high temperature synthesis (SHS) is that once initiated, highly exothermic reactions will become self-sustaining and will propagate through the reactant mixture in the form of a combustion wave. As the combustion wave (front) advances, the reactants are converted to products. A major advantage of SHS as a process for the synthesis of materials is the energy savings associated with the use of self-sustaining reactions.

Various carbides, borides, selenides, silicides and sulfides can be produced by solid-solid reactions. The starting powders, either metal and metal or metal and nonmetal, are mixed in stoichiometric proportions and cold pressed into a powder compact, typically cylindrical in shape. A heated tungsten coil (or other ignition source) ignites the top surface of the compact. The combustion wave moves rapidly down the compact and leaves behind the refractory product Various nitrides and hydrides can similarly be produced by solid-gas reactions. The metal powder compact is placed in a chamber and nitrogen or hydrogen gas at a suitable pressure, typically about 0.1 MPa (1 atm) or greater, is introduced prior to igniting the compact. The gas pressure must equal or exceed the dissociation pressure of the nitride or hydride at the adiabatic temperature. Some materials require high pressures; e.g. AlN is formed at 14 MPa and $Si_3N_4$ at 50 MPa.

Metal powders including Al, Si, Ti, and Zr have been combusted in nitrogen gas to form refractory nitrides. The processes are rapid and require no high temperature furnaces. However, when combustion of most metals is carried out at 1 atmosphere pressure of nitrogen, the yield may be low (under 50%). Insufficient nitrogen fills the pore space of a cold pressed compact of metal powders to achieve full conversion at 1 atm, and molten metal at the wave front restricts flow of nitrogen from outside the compact. In some cases a solid source of nitrogen such as $NaN_3$ can be used; e.g. ZrN, TiN, HfN, and YN have been synthesized by this method. However, AlN, $Si_3N_4$ and BN cannot be formed at 1 atm of pressure using a solid nitrogen source because of high dissociation pressures. Therefore, it is necessary to perform the combustion process in nitrogen gas under high pressure, about 10-100 MPa (100-1000 atm).

The major disadvantage of combustion synthesis is that the product is a very porous (about 50% dense) and tightly bonded solid, or a powder. The porous solid may be useful as formed, or can be easily attrited into a powder. It is generally difficult to form a fully dense product by combustion synthesis. Typically the combustion process is carried out with the simultaneous application of high external mechanical pressure. Pressure techniques include uniaxial rams, explosive compaction, isostatic pressing, and application of shock waves generated by gas guns.

Ceramic-metal composite materials (cermets) generally combine the hardness and light weight of ceramics with the toughness of metals. U.S. Pat. No. 4,605,440 issued Aug. 12, 1986 to Halverson et al. describes boron carbide-reactive metal composites, particularly $B_4C$-Al composites, and methods for making same. The process achieves conditions for liquid phase sintering of the metal and ceramic ($B_4C$) to occur. Prior to heat treatment a variety of consolidation techniques can be used to produce a fully dense composite with negligible porosity. Low temperature and pressure methods such as consolidation of codispersed ceramic and metal powders are preferred to form a green body which is then heat treated to form a fully dense composite with tailorable microstructure.

Infiltration of a molten metal into a ceramic sponge is known and has been carried out by various different methods. U.S. Pat. No. 3,718,441 to Landingham shows a method of forming metal-filled ceramics of near theoretical density by heating in a vacuum a ceramic compact with a filler metal. U.S. Pat. No. 4,585,618 to Fresnel et al shows an infiltration process in which a bulk reaction mixture of ceramic particulates is reacted to produce a self-sustaining ceramic body while in contact with molten metal which moderates the reaction and infiltrates the resulting ceramic body. U.S. Pat. No. 4,718,941 issued Jan. 12, 1988 to Halverson et al describes an improved infiltration process in which a chemically pretreated porous $B_4C$ or other boron or boride ceramic matrix or sponge is infiltrated with molten aluminum or other metal to form metal-ceramic composites of high density.

Accordingly, it would be beneficial to combine the advantageous features of combustion synthesis and infiltration in a single process to form a variety of metal-ceramic composite materials having high density which are hard, tough and light in weight. Combustion synthesis would allow formation of the ceramics from elemental components at low energy and material cost. Infiltration would provide high density and metal-ceramic reactions would produce desirable microstructures. It is desirable to control the amount of metal phase to tailor the properties of the composite for particular applications.

In particular, aluminum nitride is a ceramic material which exhibits high thermal conductivity, high electrical resistivity, high mechanical strength, and resistance to oxidation and thermal shock. As such it is commercially important for use as electronic substrates and high temperature applications. A method for forming dense AlN or AlN-Al cermet by combustion synthesis of aluminum powder in a high pressure nitrogen atmosphere is described in U.S. patent application Ser. No. 055,475 filed May 29, 1987, now U.S. Pat. No. 4,877,759, issued Oct. 31, 1989. At about 1000 atm pressure, the product is a completely converted AlN compact densified to about 92% of theoretical density. At about 680 atm the product is a cermet of AlN in an Al matrix. It is desirable to produce a high density AlN-Al cermet with controllable amounts of Al in a ceramic matrix.

SUMMARY OF THE INVENTION

Accordingly, it is an object of the invention to produce hard, tough, high density, light weight ceramic-metal composite materials.

It is also an object of the invention to provide a method for making high density ceramic-metal composite materials.

It is another object of the invention to provide a method for making high density ceramic-metal composite materials which combines combustion synthesis and infiltration processes.

It is a further object of the invention to provide an AlN-Al cermet with controllable amounts of Al in an AlN matrix and methods for making same.

The invention is a method for making high density ceramic-metal composite materials by a combined combustion synthesis-metal infiltration process, and the resulting composite materials. A porous ceramic skeleton is formed by solid-gas, solid-liquid, or solid-solid combustion synthesis reaction. A starting metal powder may be ignited in a suitable gaseous environment at a suitable pressure or a combination of metal powders or metal and nonmetal powders may be used which produce the desired ceramic. The infiltration step may be performed substantially simultaneously with the combustion synthesis step by placing the powder compact in contact with molten metal immediately behind the combustion synthesis front. Alternatively, the infiltration can be performed after the combustion synthesis formation of the ceramic preform which can be treated (thermally or chemically) prior to infiltration to enhance or facilitate the infiltration step. The invention applies to any ceramic material which can be formed by self-propagating high temperature combustion synthesis (SHS) and which can be infiltrated with a metal or alloy phase in controllable amounts to produce a substantially dense cermet. Thus, the reactants in the combustion synthesis step must be sufficiently highly exothermic to produce a self-sustaining reaction, and the metal must wet the ceramic to infiltrate.

In a preferred embodiment of the invention AlN-Al cermet is formed by formation of a structural skeleton of aluminum nitride (AlN) by combustion synthesis of aluminum (Al) compacted powder under nitrogen ($N_2$) pressure and infiltration of the remaining porosity in the AlN skeleton with molten Al or Al alloys. The parameters of this process can be varied to produce a cermet of AlN-Al with variable amounts of Al in an AlN matrix. The AlN is formed by reacting aluminium powder with $N_2$ gas at elevated pressures (up to 100 MPa, 1000 atm or 15,000 psi) after ignition of this reaction from a hot source. The propagation of this reaction throughout the Al compact is controlled by the combustion synthesis process parameters. Infiltration of molten Al into the AlN skeleton can be accomplished immediately following the combustion synthesis of Al to form the AlN structure or during subsequent treatments (thermal or chemical) above the melting point of the Al or Al alloys (up to 1300° C.) It is not possible to simultaneously form and infiltrate the AlN since any molten Al infiltrant would form the nitride (AlN) under these high $N_2$ pressures. However, simultaneous SHS and infiltration can be used in other systems, e.g. TiC-Al where porous TiC can be formed by combustion synthesis of a Ti and C compact and simultaneously infiltrated with molten Al. The content of the infiltrated metal is adjusted to optimize properties favorable to the particular application of this cermet family of materials. Such additions can even react with the AlN surfaces to enhance certain properties for specific applications. Gradient compositions are also possible to tailor properties of components to a variety of conditions in various applications. Compositions can be varied from high (up to 95%) AlN contents to high (up to 80 vol %) Al contents. Potential applications of such cermets include cutting tools, wear parts, sand blast nozzles, armor, computer and electronic components, etc. The employment of combustion synthesis to form the ceramic skeleton is advantageous to (1) allow use of less expensive starting raw materials (Al powder, etc) and (2) reduce power needs by using the heats of reaction to form the ceramic and/or cermet without expensive high temperature furnaces (greater than 1300° C.) or hot presses.

DETAILED DESCRIPTION OF INVENTION

Figure 1A:
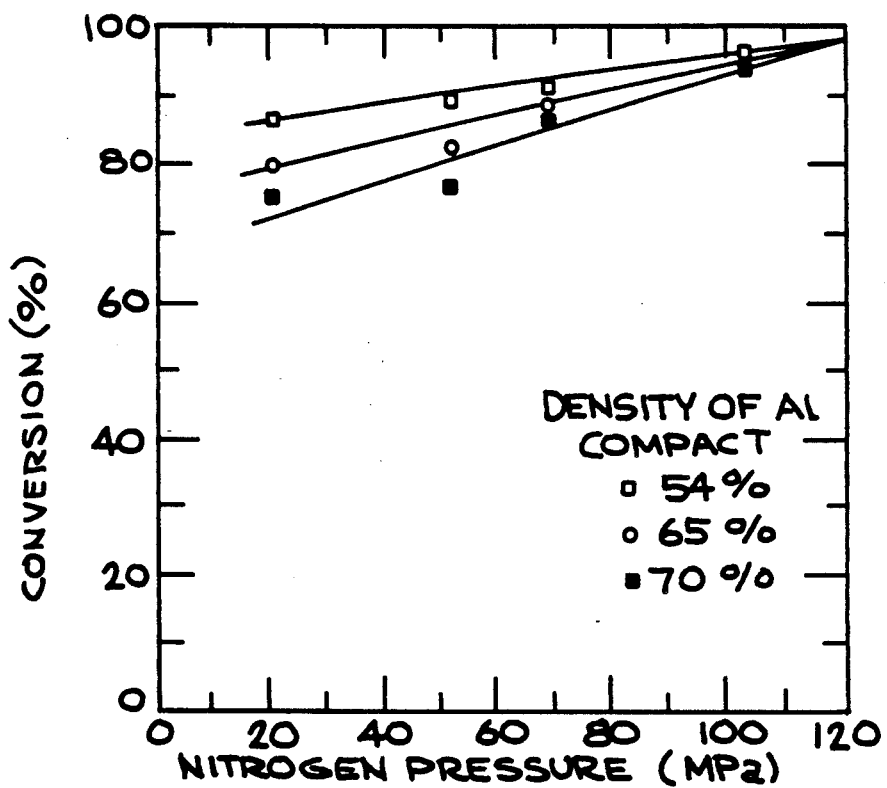
FIG. 1A is a graph of the degree of conversion (%) of Al into AlN as a function of gas pressure for various green body densities (%).
Figure 1B:
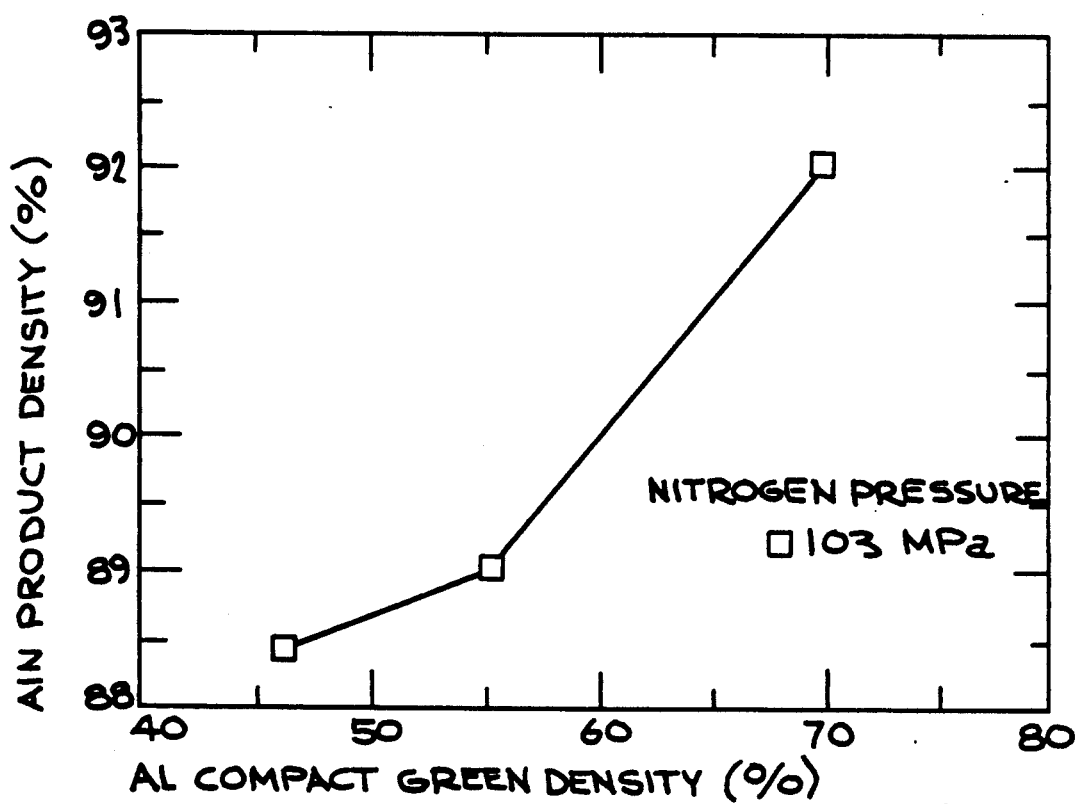
FIG. 1B is a graph of degree of AlN conversion as a function of green density (%) for one pressure (103 MPa or 15,000 psi)

In accordance with the invention, both self-propagating high temperature combustion synthesis (SHS) and molten metal infiltration are used to form ceramic-metal composites cermets with high density (low porosity). Reactions at the surface of the metal or metal alloy powders can occur with various gases after ignition by a hot source (hot wire, laser beam, thermite pellet, etc). By controlling the parameters of ignition and burn propagation of the metal compact, a desired ceramic (oxide, nitride, boride, carbide, composite ceramic etc) skeleton is formed. The degree of reaction to form the ceramic or leave a partially unreacted dispersed metal phase is also controlled by these parameters FIGS. 1A and 1B illustrate the degree of conversion of AlN as a function of pressure and green density.

Figure 2:
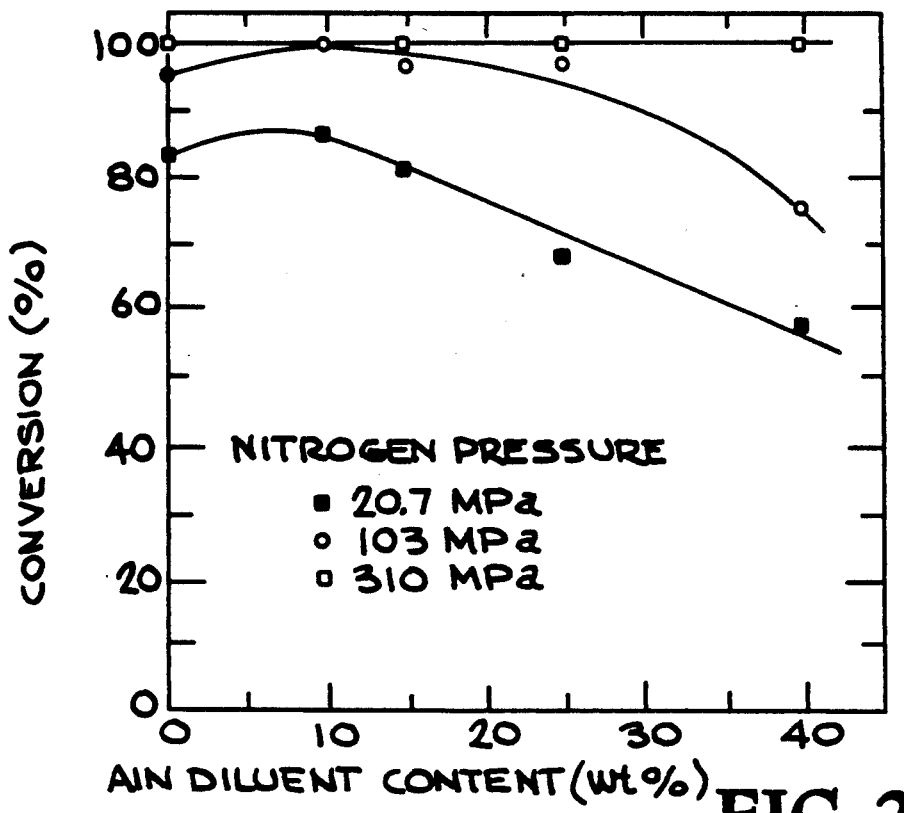
FIG. 2 is a graph of AlN conversion as a function of AlN diluent content (wt %) for various gas pressures.

Combustion synthesis of powder compacts (or equivalent bodies such as metal foam preforms) in various gases reduces power and equipment needs by using the heat of reaction to sustain the reaction with reasonable commercially available pressures (one atmosphere or 0.1 MPa to 3,000 atm or 300 MPa). Only a simple ignition source is needed to start the reaction. The propagation rate of the reaction through the compact controls the microstructure and combustion synthesis products which affect the final properties of the metal infiltrated component. Further microstructure control is possible by introducing diluents to the powder compact before ignition as with the AlN powder diluent in Al powder compacts. FIG. 2 shows the degree of AlN conversion as a function of AlN diluent content for various N$_2$ pressures B$_4$C could also be added to reduce weight of final product.

Figure 3:
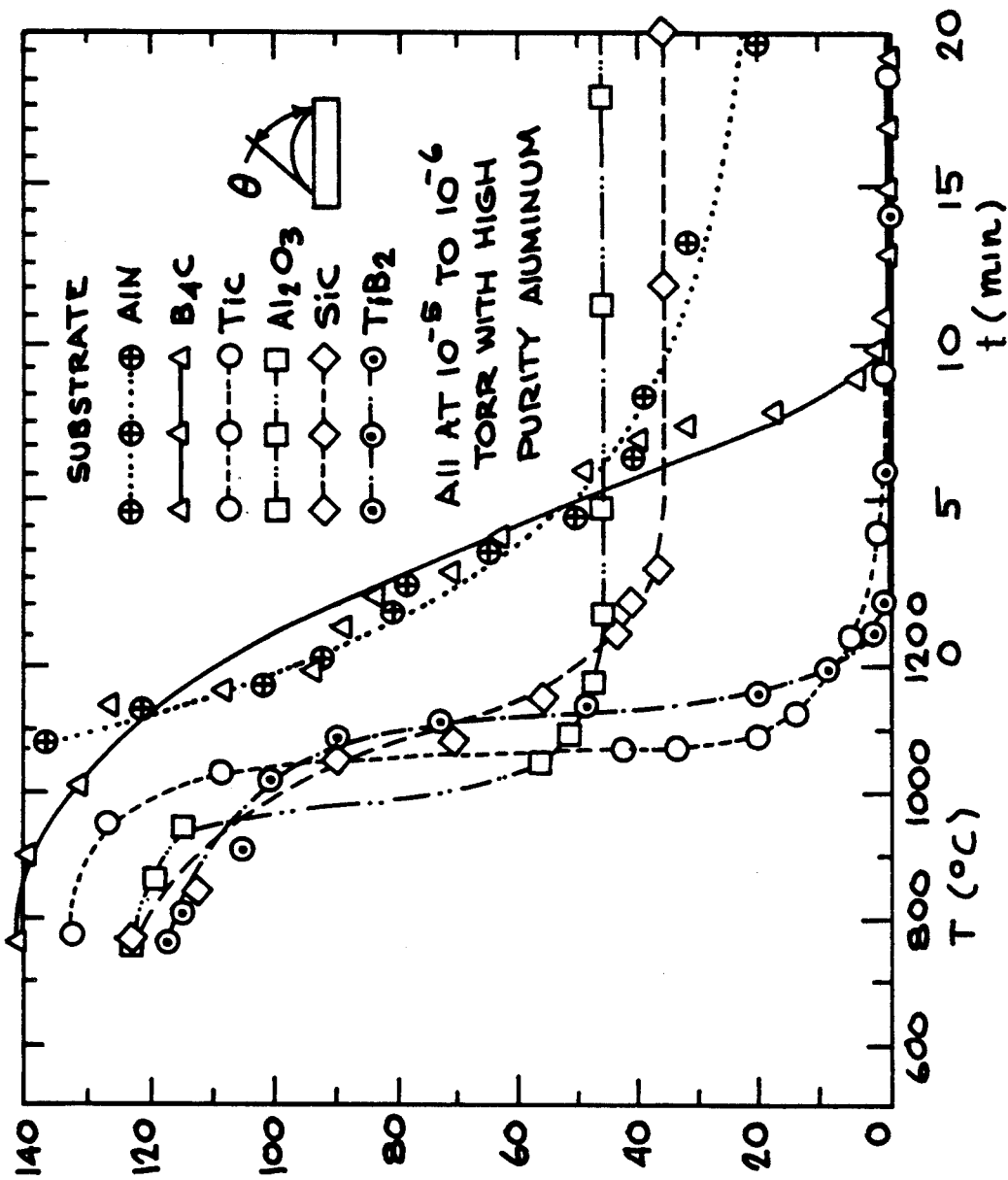
FIG. 3 is a graph of contact angle data for Al on various ceramics.

The porous ceramic body is infiltrated with molten metal to produce a cermet. FIG. 3 shows contact angle data for Al on various ceramics, showing that wetting and infiltration occur.

A desired cermet product is the AlN-Al cermet system; however, others including Si$_3$N$_4$-Si, Si$_3$N$_4$/$_{SiC-Al}$, $_{TiB_2}$-Al, AlN/B$_4$C-Al, TiB$_2$-Fe, TiN/Al$_2$O$_3$, TiC-Ni, TiB$_2$/B$_4$C-Al, TiB$_2$/TiC-Al, TiB$_2$/SiC-Al, TiC/SiC-Al, TiC/B$_4$C-Al, and B$_4$C/Al$_2$O$_3$-Al are of similar interest and importance.

Cold-pressed compacts of Al powder or Al foam preforms will burn in a N$_2$ environment to form AlN. The yield of AlN is controlled by the combustion synthesis parameters. These parameters include but are not limited to the gas pressure, the density of Al or Al alloy powder compaction, the size and surface area of the metal powder, the dilution level of the Al compact (e.g. prereacted AlN diluent), the ignition source, the surface chemistry of the powder, the contamination or dilution level of the gas, the size and shape of the compact, the wettability and reaction rate of the metal with a specific gas environment, the properties and type of reaction products generated at the reaction interface, etc. Such effects can be controlled to achieve products with desired properties for commercial markets.

The AlN-Al cermet can be formed by one-, two- or three-step processes involving combustion synthesis and infiltration. Certain cost advantages can be obtained by forming the desired cermet in one continuous process. In such cases, the metal powder compact or metal foam is reacted with the pressurized gas(es) and the heat of this reaction used to help melt additional metal for immediate infiltration into the formed ceramic structure. To sustain heating for a prolonged period of time would require this combustion and infiltration process to be conducted inside an insulated container or a simple furnance capable of maintaining a temperature of up to 1300° C. There are applications where the desired properties of the component are difficult to control under these dynamic conditions and a two- or three-step process is preferred.

The two-step process would include the combustion synthesis of the Al or Al alloy powder compact in N$_2$or N$_2$ plus other gas mixtures to form a controlled AlN skeleton structure with interconnecting pores throughout the compact. This porous compact is subsequently exposed to molten Al or Al alloy in an externally-heated fixture to allow infiltration of the molten metal into these interconnecting pores. Subsequent heat treatment of the dense cermet may also be necessary to fine-tune the desired properties of the cermet. Such heat treatments can improve the mechanical and/or physical properties of the metal infiltrate phase and/or cause additional reactions between the ceramic and metal phase to improve metal to ceramic interfaces or convert some of the metal into a ceramic or different metallic phase.

The three-step process would include a surface treatment of the ceramic skeleton formed by combustion synthesis before infiltration with molten metal. This surface treatment could be thermal (in inert or reactive gases like H$_2$), chemical, electrical, mechanical, etc. The objective of this intermediate step is to condition the surfaces to improve interface wetting and properties of this metal/ceramic interface during infiltration and possible subsequent treatments.

The use of the one-step process takes advantage of the heat of reaction during combustion synthesis of inexpensive raw materials and reduces power and furnace equipment costs. The two- and three-step processes allow closer control of the process so unique refinements to the product are possible.

Thus, in accordance with the invention, unique cermet components can be formed from the combustion synthesis of inexpensive raw materials (like Al powders) in reactive gases (like N$_2$) or mixtures of gases (reactive or reactive/passive mixtures like N$_2$/argon). Alternatively, solid-solid and solid-liquid reactions are usually without the need for a reactive gas atmosphere. Powder compacts or porous bodies are ignited in such gas environments with single or multiple sources (hot wires, laser beams, spark discharges, thermite pellets, etc) and sustain a reaction front that propagates through the body at a controlled rate to form a porous ceramic or cermet component for substantially simultaneous or subsequent molten metal infiltration. Some residual porosity could also be desired in such bodies for specific applications (filters, lubricated bears, cooling channels, etc) and can be obtained by adjusting the combustion synthesis, infiltration, and/or subsequent treatments of the component.

Due to the nature of the process, the microstructure can be adjusted for optimum property control in each application. This includes the variation of metal and ceramic composition, size and distribution of metal, ceramic, and reactive product phases, gradient of microstructure features across the thickness, width, or depth of the component, variation of properties to meet specific needs, etc.

This cost effective invention takes advantage of the low input power needed to ignite relatively inexpensive powder compacts or porous bodies in readily available commercial gas pressure vessels (atmospheric to 310 MPa or 3,000 atm pressures). Temperature and reaction products are controlled by the combustion synthesis parameters, ignition parameters, surface radiation conditions, etc. While this process is described with respect to a few material systems (AlN-Al, B$_4$C/Al$_2$O$_3$-Al), the general concepts are applicable to a very wide class of materials and applications.

Since the general shape of the powder compact or porous bodies stays the same during combustion synthesis and infiltration, near-net-shape components can be produced to further reduce costs of post machining. Even post combustion machining of most as-combustion synthesized porous bodies or infiltrated cermets before subsequent heat treatments is extremely cost effective to machine and shape before final treatments harden and strengthen their final properties.

A preferred starting powder is aluminum (Al) or one of its alloys, or a compound that can form AlN when ignited by a simple source (hot W-wire, laser beam, electron beam, spark discharge, thermite reaction, etc). A controlled combustion front propagates from the ignition source(s) by reacting the Al with the gas environment to form aluminum nitride (AlN) and the amount of residual interconnecting porosity and Al metal is controlled by the combustion synthesis parameters and subsequent treatments. After the molten Al metal or alloy infiltration process and for certain applications, the level of retained Al is up to 25 vol % and the retained fine (up to 100 μm dia) porosity is up to 5 vol % of the final component. More unreacted Al is retained at lower pressures as shown in FIG. 1A which shows the degree of conversion of Al into AlN as a function of $N_2$ gas pressure for various green density (density of the Al powder compact). The retained porosity is controlled by the nitrogen gas pressure, the amount of gaseous reaction products ($CO$, $CO_2$, $H_2O$, etc) evolved and the initial porosity (or green density) of the compact primarily during the combustion synthesis process and degree of wettability at the ceramic/molten metal interface once the AlN surface is formed. Alloy additions to the molten aluminum and gas environments (e.g. adding $H_2$ gas dry or wet to the reactant or reactant/passive gas mixture) affect this degree of wettability and the resulting overall porosity within the cermet component. By controlling the purity of the material and the gas pressure with a combustion synthesis vessel, the porosity and AlN yield can be controlled. It is preferable to work at pressures (up to 3,000 atm or 300 MPa) easily attainable with commercially available vessels. Lower pressures have provided complete reaction of Al to AlN and better components. The rate of reaction is also controlled by reactive gas concentration in the powder compact at ignition and the characteristics of the powder and its compact. For certain applications AlN with finer pore sizes (up to 30 μm dia) filled with Al during molten Al infiltration to achieve 95% theoretical dense cermets is preferred. It is also preferred to control the Al metal concentration across the thickness of tile components from between 1 to 50 vol % Al in the AlN matrix. Certain Al alloys (7057, 5083, etc) improve the properties of such cermets as do selective heat treatments of the AlN-Al alloy cermets. These improvements are due to the strengthening and chemical behavior of the Al alloy itself and possible AlN-metal interface reactions. The AlN-Al cermet shows great promise in many applications due to its improved fracture toughness, overall strength to weight ratio, high thermal conductivity, hardness, wear resistance, and ductility at high strain rate. Such properties suggest many applications such as cutting tools, wear bearings, seal rings, sand blast nozzles, lightweight armor, electronic substrates, computer disk drive components, etc.

Figure 4:
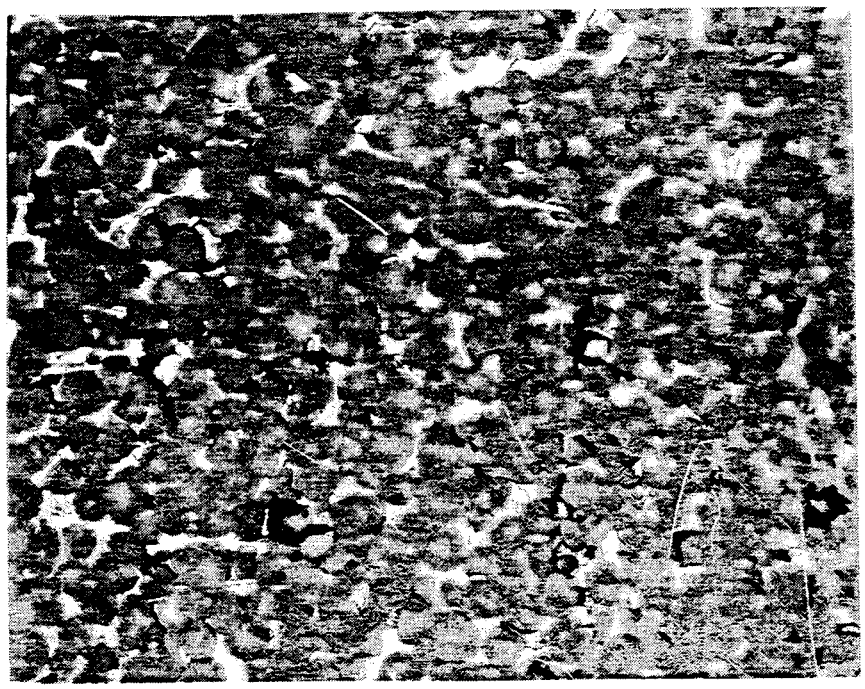
FIG. 4 is a photomicrograph of AlN×Al cermet at 500X.

FIG. 4 is a photomicrograph (500X) of AlN-Al cermet made by the invention.

An alternate preferred system is $B_4C/Al_2O_3$- Al. In this example the combustion synthesis of a $B_2O_3$- +Al+C blended powder compact was ignited in argon or other (inert) gases to form a $B_4C/Al_2O_3$ porous component. The starting materials are all very common and low cost. Al infiltration into this porous component during the combustion synthesis or by subsequent infiltration step(s) was possible. The very different properties of this composite cermet provides components for similar applications to the AlN-Al cermet and other neutron absorbing applications.

Other systems can be similarly produced according to the invention. $Si_3N_4$-Si is prepared by combustion synthesis of a Si compact in $N_2$ with Si infiltration. $TiB_2$-Al or $TiB_2$-Fe is made by combustion synthesis of a Ti and B compact with Al or Fe infiltration; TiC-Ni by combustion synthesis of a Ti+C compact with Ni infiltration. $TiB_2/B_4C$-metal, $TiB_2/TiC$-metal and $TiC/B_4C$-metal are all made from a B, C, Ti compact, depending on the ratio of starting reactants, followed by metal infiltration. $TiN/Al_2O_3$-Ti is made from a Ti+$Al_2O_3$ compact in $N_2$ or $TiO_2$+Al compact in $N_2$ with Ti infiltration. $AlN/B_4C$-Al is made from a Al+B +C compact in $N_2$ or Al with $B_4C$ in $N_2$, and Al infiltration. $TiB_2/SiC$-Al and TiC/SiC-Al are made from Ti+B+Si+C or Ti+Si+C compacts with Al infiltration. $Si_3N_4/SiC$-Al is prepared by combustion synthesis of Si+C powder in $N_2$ with Al infiltration. Thus, a wide variety of cermets may be produced by solid-gas, solid-solid (metal-metal or metal-nonmetal) and solid-liquid reactions, or combinations thereof, with liquid metal infiltration.

Figure 5:
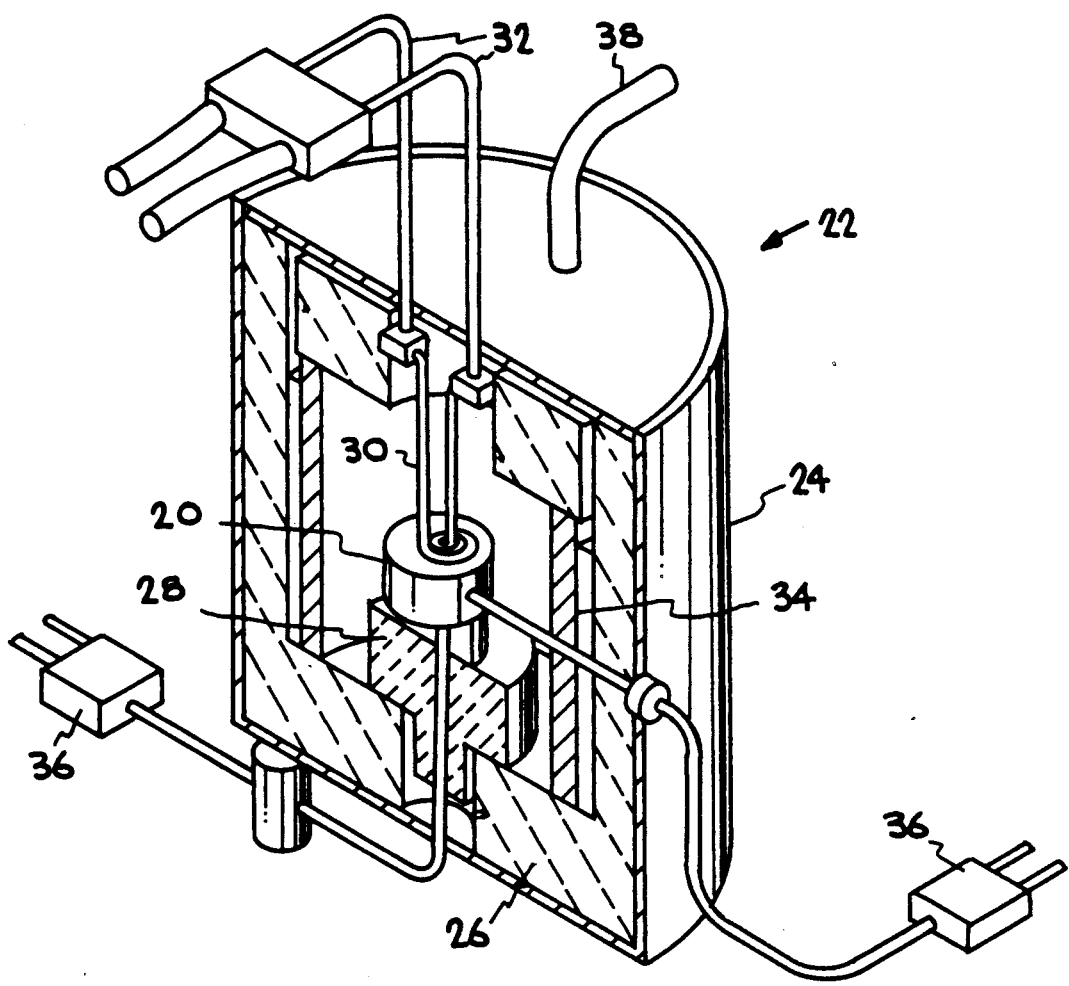
FIG. 5 is a perspective sectional view of a combustion chamber.

An apparatus for carrying out the invention is illustrated in FIG. 5. A metal powder compact or pellet 20 is placed in a combustion chamber 22. Chamber 22 is formed of a pressure vessel 24 with a thick thermally insulating material 26 therein. A pellet 24 is placed on a refractory pedestal 28 inside chamber 22. Nitrogen or other gas is introduced into chamber 22 through gas inlet 38. Ignition within the chamber is accomplished using resistance heated tungsten coil 30 which is connected to electrodes 32. Alternately other ignition sources such as laser or primer pellets such as thermites may be used. Hear 34 can be used to provide additional heat for providing molten metal for infiltration into the porous ceramic body formed by combustion. Thermocouples 36 are used to monitor temperature.

Changes and modifications in the specifically described embodiments can be carried out without departing from the scope of the invention which is intended to be limited only by the scope of the appended claims.

We claim:

1. A method of forming a ceramic-metal composite material, comprising the steps of:
   forming an infiltratable porous ceramic skeleton by self-propagating high temperature combustion synthesis of a powder compact;
   substantially simultaneously infiltrating the thus-formed high temperature highly wettable ceramic skeleton with molten metal wherein said infiltrating step utilizes combustion heat from said combustion synthesis step.

2. The method of claim 1 wherein the step of forming the porous ceramic compact is performed by igniting a metal powder compact in a reactive gas atmosphere to produce a self-propagating combustion wave in the powder compact.

3. The method of claim 1 wherein the step of forming the porous ceramic skeleton is performed by forming a powder compact of a mixture of metal powders and igniting the powder compact to produce a self-propagating combustion wave in the powder compact.

4. The method of claim 1 wherein the step of forming the porous ceramic skeleton is performed by forming a powder compact of a mixture of metal and nonmetal powders and igniting the powder compact to produce a self-propagating combustion wave in the powder compact.

5. The method of claim 2 wherein the metal powder compact is formed of Al powder and the reactive gas is $N_2$.

6. The method of claim 5 further comprising providing the $N_2$ gas at a pressure of about 7 to 310 MPa.

7. The method of claim 5 wherein the step of infiltrating with molten metal is performed by infiltrating with molten Al or Al alloy.

8. The method of claim 1 further comprising infiltrating the ceramic skeleton with sufficient molten metal to form a substantially fully dense composite body.

9. The method of claim 1 further comprising adding a diluent to the powder compact prior to combustion synthesis.

10. A ceramic-metal composite formed by the method of claim 1.

11. A composite of claim 10 selected from $Si_3N_4$-Si, $Si_3N_4$/SiC-Al, $TiB_2$-Al, AlN/$B_4$C-Al, $TiB_2$-Fe, TiN/$Al_2O_3$, TiC-Ni, $TiB_2$/$B_4$C-Al, $TiB_2$/TiC-Al, $TiB_2$/SiC-Al, TiC/SiC-Al, TiC/$B_4$C-Al, and $B_4$C/$Al_2O_3$-Al.

12. A method of forming an AlN-Al composite material, comprising:
    forming a porous AlN ceramic body by
        forming an Al powder compact;
        placing the Al powder compact in an $N_2$ atmosphere;
        igniting the Al powder compact in the $N_2$ atmosphere to produce a self-propagating combustion wave in the Al compact;
    infiltrating the AlN ceramic body with molten Al.

13. The method of claim 12 further comprising infiltrating the AlN ceramic body with a controllable amount of molten Al to form a substantially fully dense AlN-Al composite.

14. The method of claim 12 further comprising adding AlN diluent to the Al powder compact.

15. The method of claim 12 wherein the step of infiltrating the AlN ceramic body with molten Al is performed substantially immediately after forming a porous AlN ceramic body.

16. The method of claim 12 further comprising maintaining the $N_2$ atmosphere at a pressure of about 7 to 310 MPa while forming the porous AlN ceramic body.

17. N-Al composite formed by the method of claim 12.

18. A substantially fully dense AlN-Al composite material having a controlled amount of metal phase (Al) in a ceramic matrix (AlN).

* * * * *